United States Patent
Tang et al.

(10) Patent No.: US 12,335,617 B2
(45) Date of Patent: Jun. 17, 2025

(54) IMAGE STABILIZATION METHOD AND ELECTRONIC DEVICE

(71) Applicant: ASUSTeK COMPUTER INC., Taipei (TW)

(72) Inventors: Wei-Lien Tang, Taipei (TW); Jo-Fan Wu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 79 days.

(21) Appl. No.: 18/358,027

(22) Filed: Jul. 25, 2023

(65) Prior Publication Data
US 2025/0039543 A1    Jan. 30, 2025

(51) Int. Cl.
*H04N 23/68*    (2023.01)

(52) U.S. Cl.
CPC ....... *H04N 23/683* (2023.01); *H04N 23/6811* (2023.01)

(58) Field of Classification Search
None
See application file for complete search history.

(56) References Cited

U.S. PATENT DOCUMENTS

| | | | | |
|---|---|---|---|---|
| 7,408,986 B2 * | 8/2008 | Winder | .............. | H04N 21/4782 348/E7.071 |
| 8,810,677 B2 * | 8/2014 | Hsu | .............. | H04N 25/134 348/241 |
| 2004/0001147 A1 * | 1/2004 | Vella | .............. | H04N 23/68 348/208.99 |
| 2006/0182430 A1 * | 8/2006 | Stavely | .............. | G03B 7/08 396/243 |
| 2008/0291288 A1 * | 11/2008 | Tzur | .............. | H04N 23/71 348/222.1 |
| 2009/0231446 A1 * | 9/2009 | Lin | .............. | H04N 23/6811 348/208.4 |
| 2018/0070089 A1 * | 3/2018 | Pan | .............. | H04N 23/6811 |

FOREIGN PATENT DOCUMENTS

| | | |
|---|---|---|
| TW | 200632529 | 9/2006 |
| TW | 201322765 | 6/2013 |

* cited by examiner

*Primary Examiner* — James M Hannett
(74) *Attorney, Agent, or Firm* — JCIPRNET (57) ABSTRACT

An image stabilization method and an electronic device. The image stabilization method is adapted for the electronic device including a camera module, and the method includes the following steps. Multiple continuous images are captured through the camera module. Feature point extraction is performed on a reference image among the continuous images, and multiple reference feature points of the reference image are obtained. Feature point tracking is performed on a first image among the continuous images based on the reference feature points, so as to obtain multiple first feature points of the first image. A space transformation matrix between the reference image and the first image is obtained according to the reference feature points and the first feature points. The first image is corrected according to the space transformation matrix, and a field-of-view stabilized image is obtained.

11 Claims, 6 Drawing Sheets

IMAGE STABILIZATION METHOD AND ELECTRONIC DEVICE

BACKGROUND

Technical Field

The disclosure relates to an electronic device and an image stabilization method thereof.

Description of Related Art

Generally speaking, in order to maintain a shooting field of view (FOV) of a shooting device during image shooting, fixing the shooting device through fixed equipment is often required. It can be seen that the fixed equipment (such as a tripod) is not only inconvenient to carry, but also cannot be applied to various shooting environments as one likes. Currently, the shooting device may have a built-in optical image stabilization (OIS) function, and the hardware assemblies of the OIS function may compensate for the vibration of the shooting device. However, the OIS function still cannot fully compensate the vibration of the shooting device, resulting in poor stability of the captured image. In addition, the hardware assemblies that assist in maintaining a stable shooting image increase hardware space usage and manufacturing costs. If a user cannot shoot multiple continuous images with good stability while maintaining a stable shooting FOV, a good-quality shooting image cannot be synthesized according to the continuous images. Although there is currently an image processing method implemented by software to perform image stabilization according to image content, a dynamic object in the shooting scene causes the existing image stabilization effect to be adversely affected.

SUMMARY

The disclosure provides an image stabilization method, which is adapted for an electronic device including a camera module, and the method includes the following steps. Multiple continuous images are captured through the camera module. Feature point extraction is performed on a reference image among the continuous images, and multiple reference feature points of the reference image are obtained. Feature point tracking is performed on a first image among the continuous images based on the reference feature points, so as to obtain multiple first feature points of the first image. Each of the first feature points matches one of the reference feature points. A space transformation matrix between the reference image and the first image is obtained according to the reference feature points and the first feature points. The first image is corrected according to the space transformation matrix, and a field-of-view stabilized image is obtained.

The disclosure further provides an electronic device, which includes a camera module and a processor. The processor is configured to perform the following operations. Multiple continuous images are captured through the camera module. Feature point extraction is performed on a reference image among the continuous images, and multiple reference feature points of the reference image are obtained. Feature point tracking is performed on a first image among the continuous images based on the reference feature points, so as to obtain multiple first feature points of the first image. Each of the first feature points matches one of the reference feature points. A space transformation matrix between the reference image and the first image is obtained according to the reference feature points and the first feature points. The first image is corrected according to the space transformation matrix, and a field-of-view stabilized image is obtained.

Based on the above, in the embodiment of the disclosure, feature points of another image among the continuous images other than the reference image may be obtained according to the feature point tracking. A space transformation matrix between the reference image and the another image may be calculated according to the reference feature points of the reference image and the feature points of the another image. The space transformation matrix may be configured to correct the another image, and a field-of-view stabilized image based on the reference image is obtained. Obtaining the feature points of the another image through the feature point tracking may reduce the negative impact of a dynamic object on image stabilization, thereby improving image stabilization quality.

DESCRIPTION OF THE EMBODIMENTS

Some embodiments of the disclosure accompanied with drawings are described in detail as follows. The reference numerals used in the following description are regarded as the same or similar elements when the same reference numerals appear in different drawings. These embodiments are only a part of the disclosure, and do not disclose all the possible implementations of the disclosure. To be more precise, the embodiments are only examples of methods and devices in the scope of the claims of the disclosure.

Figure 1:
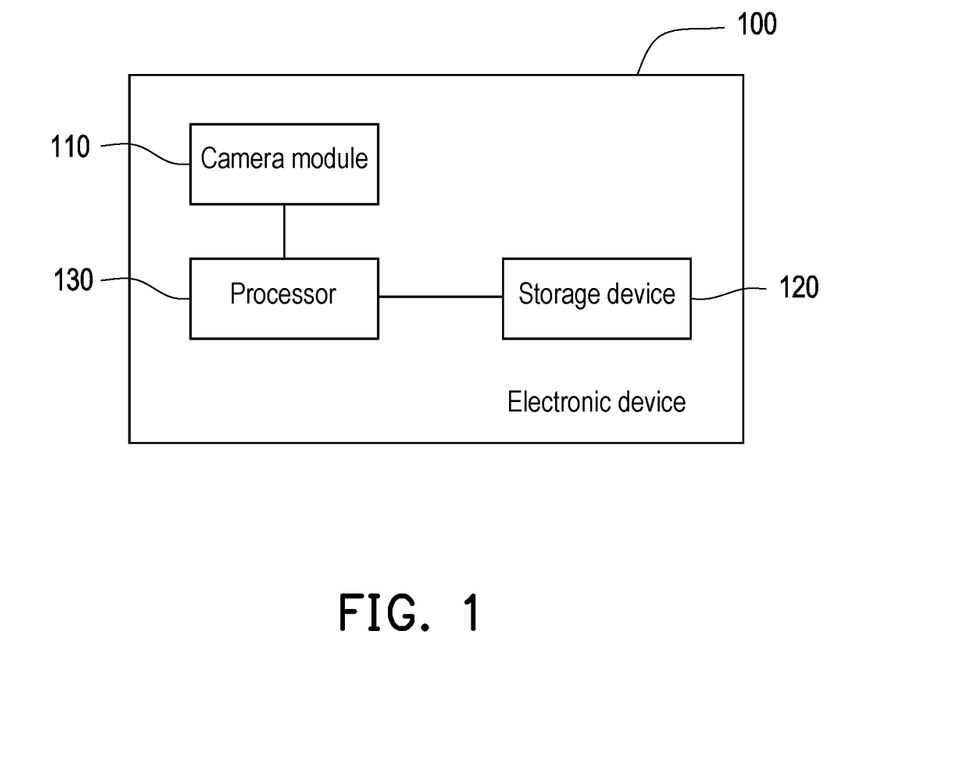
FIG. 1 is a schematic diagram of an electronic device according to an embodiment of the disclosure.

FIG. 1 is a schematic diagram of an electronic device according to an embodiment of the disclosure. Referring to FIG. 1, in different embodiments, an electronic device 100 may be, for example, a handheld electronic device with a camera function such as a digital camera, a tablet computer, a game machine and a mobile phone, which is not limited in the disclosure. In FIG. 1, the electronic device 100 may include a camera module 110, a storage device 120 and a processor 130.

The camera module 110 may include an image sensor and a lens. A photosensitive element of the image sensor is configured to sense the light intensity entering the corresponding lens to generate an image respectively. The photosensitive element is, for example, a charge coupled device (CCD), a complementary metal-oxide semiconductor (CMOS) element or other elements, which is not limited in the disclosure. The camera module 110 may further include other elements such as an aperture, which is not limited here.

The storage device 120 may be configured to store data such as images, instructions, program codes, software modules, etc., and the storage device 120 may be, for example, any type of fixed or removable random access memory (RAM), read-only memory (ROM), flash memory, hard disk or other similar devices, integrated circuits or combinations thereof.

The processor 130 is coupled to the camera module 110 and the storage device 120, and the processor 130 is, for example, a central processing unit (CPU), an application processor (AP), or other programmable general purpose or special purpose microprocessors, a digital signal processor (DSP), an image signal processor (ISP), a graphics processing unit (GPU) or other similar devices, integrated circuits or combinations thereof.

In some embodiments, the processor 130 may access and execute the software modules recorded in the storage device 120 to implement the image stabilization method in the embodiments of the disclosure. The above-mentioned software modules may be broadly interpreted to mean instructions, instruction sets, codes, program codes, programs, applications, software packages, threads, procedures, functions, etc., regardless of being referred to as software, firmware, intermediate software, microcode, hardware description language or others.

Figure 2:
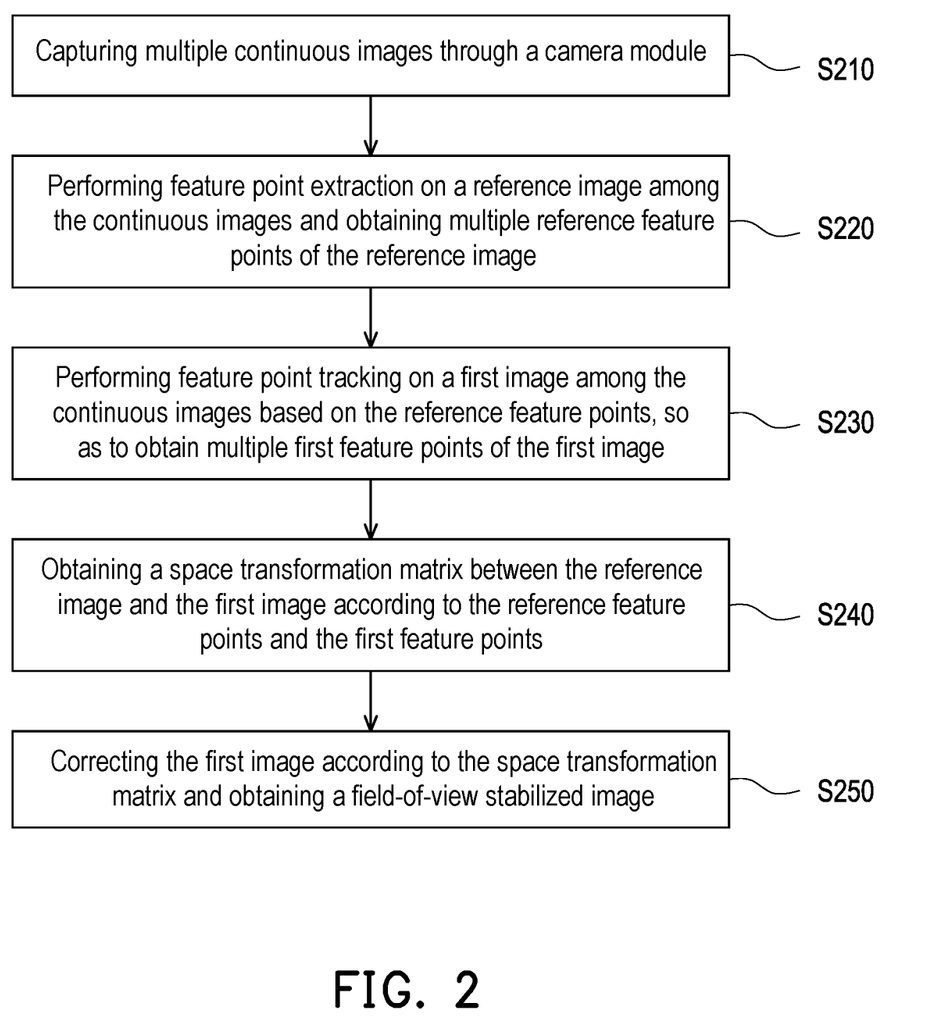
FIG. 2 is a flowchart of an image stabilization method according to an embodiment of the disclosure.

FIG. 2 is a flowchart of an image stabilization method according to an embodiment of the disclosure. Referring to FIG. 2, the method of the embodiment may be executed by the electronic device 100 of FIG. 1, and the details of each step in FIG. 2 are described below with the elements shown in FIG. 1.

In step S210, the processor 130 captures multiple continuous images through the camera module 110. In some embodiments, in response to the electronic device 100 receiving a camera instruction from the user, the camera module 110 may continuously capture multiple continuous images according to a capture frequency (unit: fps). The continuous images may be short exposure images respectively.

In step S220, the processor 130 performs feature point extraction on a reference image among the continuous images and obtains multiple reference feature points of the reference image. The reference image is one of the continuous images. The processor 130 may use a feature point extraction algorithm to extract multiple reference feature points of the reference image. The aforementioned feature point extraction algorithm is, for example, a scale-invariant feature transform (SIFT) algorithm, a Harris corner detection algorithm, a speeded up robust features (SURF) algorithm, or other algorithms, which is not limited in the disclosure. In some embodiments, each continuous image may have a frame number according to shooting sequence thereof, and the processor 130 may select the reference image according to a preset frame number. For example, the processor 130 may use the R-th frame of image among the continuous images as the reference image.

In step S230, the processor 130 performs feature point tracking on a first image among the continuous images based on the reference feature points, so as to obtain multiple first feature points of the first image. Each of the first feature points matches one of the reference feature points. The first image is, for example, an adjacent frame of the reference image or n frames away from the reference image. The processor 130 may use a feature point tracking algorithm to extract multiple first feature points of the first image according to the reference feature points. The aforementioned feature point tracking algorithm is, for example, Lucas-Kanade optical flow algorithm, Horn-Schunck optical flow algorithm or other optical flow algorithms, which is not limited in the disclosure. Furthermore, the processor 130 may search the first image for pixel regions with similar features based on each of the reference feature points, so as to track the first feature points corresponding to the reference feature points from the first image.

Figure 3:
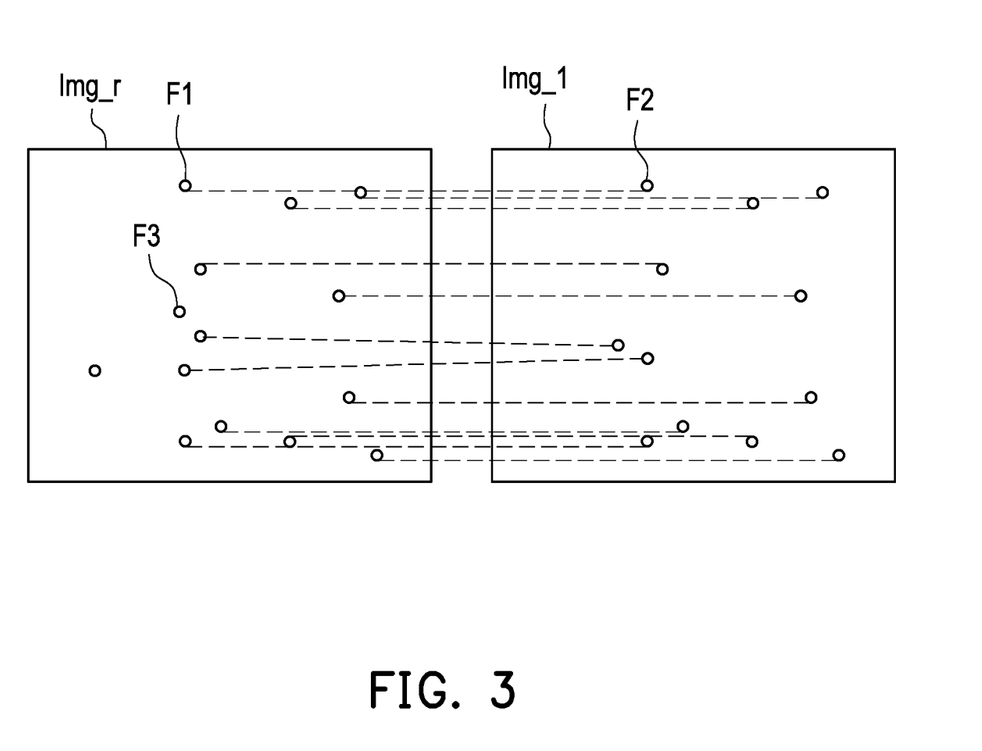
FIG. 3 is a schematic diagram of feature point tracking according to an embodiment of the disclosure.

For example, referring to FIG. 3, the processor 130 may perform feature extraction on an reference image Img_r in multiple continuous images, and obtain multiple reference feature points (such as reference feature points F1 and F3) in the reference image Img_r. Moreover, the processor 130 may perform feature point tracking on a first image Img_1 based on the reference feature points in the reference image Img_r, and multiple first feature points (e.g., a first feature point F2) in the first image Img_1. It should be noted that in the image sequence, the feature point may disappear due to the movement of a dynamic object. That is to say, not every reference feature may be tracked successfully, for example, the processor 130 cannot find a matching feature point from the first image Img_1 based on the reference feature point F3. However, each of the first feature points in the first image Img_1 is matched with a corresponding reference feature point.

In step S240, the processor 130 obtains a space transformation matrix between the reference image and the first image according to the reference feature points and the first feature points. In detail, according to the feature matching pair composed of each of the first feature points and the corresponding reference feature point, the processor 130 may use least squares method or random sample consensus (RANSAC) and other methods to estimate the space transformation matrix. The space transformation matrix may include an affine transformation matrix, a homography matrix, or other image space transformation matrices.

In step S250, the processor 130 corrects the first image according to the space transformation matrix and obtains a field-of-view stabilized image. Specifically, the processor 130 may perform geometric transformation on the first image by using the space transformation matrix and obtain the field-of-view stabilized image. For example, the geometric transformation includes scaling transformation, translation transformation, affine transformation, or perspective transformation, etc. It should be noted that based on the application of feature point tracking, the feature points belonging to the dynamic object may not be configured to determine the space transformation matrix, so as to reduce the adverse interference of the dynamic object on the stabilized FOV.

Figure 4:
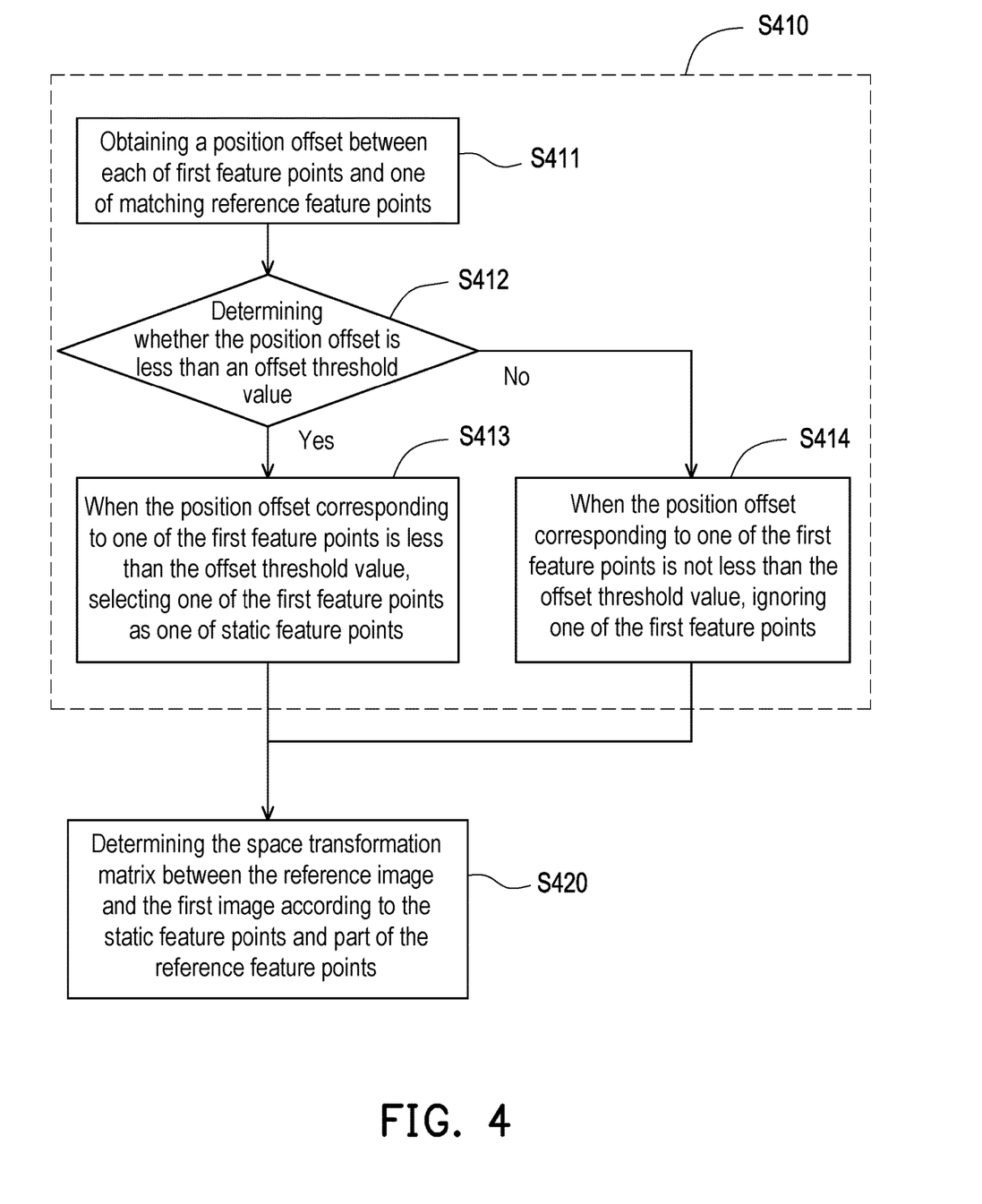
FIG. 4 is a flowchart of determining a space transformation matrix according to an embodiment of the disclosure.

In addition, in some embodiments, referring to FIG. 4, the step S240 of determining the space transformation matrix may be implemented as steps S410 to S420.

In step S410, the processor 130 screens out multiple static feature points from the first feature points according to a position offset between each of the first feature points and one of the matching reference feature points. According to the position offset between each of the first feature points and the matching reference feature point, the processor 130 may analyze whether each of the first feature points is related to a dynamic object. Specifically, if a certain first feature point is determined to be related to the dynamic object, the processor 130 may exclude the first feature point related to the dynamic object to determine the space transformation matrix. If a certain first feature point is determined to be irrelevant to the dynamic object, the processor 130 determines the space transformation matrix according to the first feature point. In other words, the processor 130 may filter out the static feature points associated with the static scene according to the position offset corresponding to each of the first feature points.

In some embodiments, step S410 may be implemented as steps S411 to S414. In step S411, the processor 130 obtains a position offset between each of the first feature points and one of the matching reference feature points. The above-mentioned position offset is, for example, the movement vector between each of the first feature points and the matching reference feature point, which may be calculated according to the X coordinate and Y coordinate of each of the first feature points and the X coordinate and Y coordinate of the matching reference feature point. Alternatively, the aforementioned position offset is, for example, the difference between the X coordinate of each of the first feature points and the X coordinate of the matching reference feature point. Alternatively, the aforementioned position offset is, for example, the difference between the Y coordinate of each of the first feature points and the Y coordinate of the matching reference feature point.

In step S412, the processor 130 determines whether the position offset is less than an offset threshold value. That is, the processor 130 may compare the position offset and the offset threshold value between each of the first feature points and one of the matching reference feature points. The offset threshold value may be set according to requirements, which is not limited in the disclosure.

If the determination in step S412 is positive, in step S413, when the position offset corresponding to one of the first feature points is less than the offset threshold value, the processor 130 selects one of the first feature points as one of the static feature points. That is to say, if the position offset corresponding to a certain first feature point is less than the offset threshold value, the processor 130 may determine that the first feature point is irrelevant to the dynamic object and regard the first feature point as a static feature point.

If the determination in step S412 is negative, in step S414, when the position offset corresponding to one of the first feature points is not less than the offset threshold value, the processor 130 ignores one of the first feature points. That is to say, if the position offset corresponding to a certain first feature point is not less than the offset threshold value, the processor 130 may determine that the first feature point is related to the dynamic object and ignore the first feature point.

Based on the implementation of step S410, the processor 130 may filter out the feature points related to the dynamic object to obtain the static feature points. In step S420, the processor 130 determines the space transformation matrix between the reference image and the first image according to the static feature points and part of the reference feature points. That is to say, in addition to the feature tracking algorithm that may filter out the feature points generated by the dynamic object, the embodiment of the disclosure may further select the static feature points according to the position offset of the feature points. In this way, the space transformation matrix may be generated according to the static feature points, reducing the negative impact of the dynamic object on image stabilization.

However, in addition to processing the screening of the image feature points, some embodiments of the disclosure may further check the space transformation matrix, thereby improving the quality of image stabilization. Embodiments are listed below for illustration.

Figure 5:
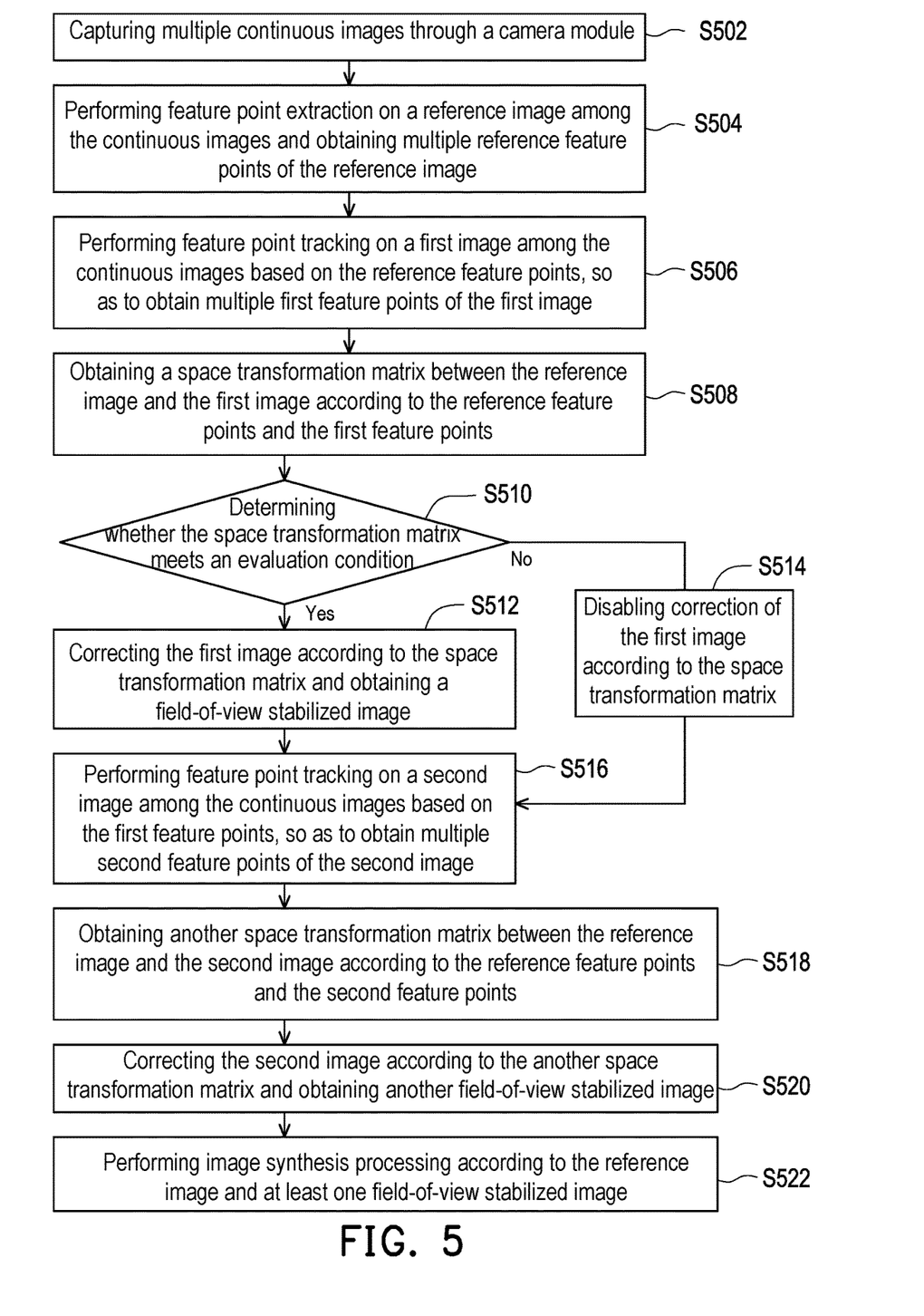
FIG. 5 is a flowchart of an image stabilization method according to an embodiment of the disclosure.

Referring to FIG. 5, the method of the embodiment may be executed by the electronic device 100 of FIG. 1, and the details of each step in FIG. 5 are described below with the elements shown in FIG. 1.

In step S502, the processor 130 captures multiple continuous images through the camera module 110. In step S504, the processor 130 performs feature point extraction on a reference image among the continuous images and obtains multiple reference feature points of the reference image. In step S506, the processor 130 performs feature point tracking on a first image among the continuous images based on the reference feature points, so as to obtain multiple first feature points of the first image. In step S508, the processor 130 obtains a space transformation matrix between the reference image and the first image according to the reference feature points and the first feature points. The detailed implementation manners of steps S502 to S508 have been described in the foregoing embodiments, and the descriptions are not repeated here.

In step S510, the processor 130 determines whether the space transformation matrix meets the evaluation condition. In the conventional method, the reliability of image stabilization is confirmed by evaluating the similarity between the corrected image after geometric transformation and the reference image. In the disclosure, the reliability of image stabilization is confirmed by evaluating the space transformation matrix, which may greatly save the amount of computation.

In some embodiments, the processor 130 determines whether the matrix elements in the space transformation matrix are within a preset range. Specifically, the space transformation matrix may include multiple matrix elements, and the processor 130 may respectively determine whether the matrix elements are within a corresponding preset range. If the matrix elements in the space transformation matrix are not within the preset range, the processor 130 may determine that the space transformation matrix does not meet the evaluation condition. If the matrix elements in the space transformation matrix are within the preset range, the processor 130 may determine that the space transformation matrix meets the evaluation condition. For example, taking a 3*3 affine matrix as an example, the processor 130 may respectively determine whether the nine matrix elements are respectively less than the corresponding threshold values.

In some embodiments, the processor 130 determines whether the similarity between the space transformation matrix and a reference space transformation matrix is greater than a similarity threshold value. The reference space transformation matrix is generated according to the reference image and a third image among the continuous images. For example, the processor 130 may calculate the similarity between a space transformation matrix corresponding to the (i−n)-th frame of image and a space transformation matrix corresponding to the i-th frame of image. When the similarity between the space transformation matrix corresponding to the (i−n)-th frame of image and the space transformation matrix corresponding to the i-th frame of image is greater than the similarity threshold value, the processor 130 may determine that the space transformation matrix corresponding to the i-th frame of image meets the evaluation condition. Conversely, when the similarity between the space transformation matrix corresponding to the (i−n)-th frame of image and the space transformation matrix corresponding to the i-th frame of image is not greater than the similarity threshold value, the processor 130 may determine that the space transformation matrix corresponding to the i-th frame of image does not meet the evaluation condition. In some embodiments, the above-mentioned similarity may be, for example, the distance between the two space transformation matrices or other information.

If the determination in step S510 is positive, in step S512, when the space transformation matrix meets the evaluation condition, the processor 130 corrects the first image according to the space transformation matrix and obtains a field-of-view stabilized image. That is to say, when the processor 130 determines that the space transformation matrix corresponding to the first image meets the evaluation condition, the processor 130 may correct the first image according to the space transformation matrix and obtain a field-of-view stabilized image.

If the determination in step S510 is negative, in step S514, when the space transformation matrix does not meet the evaluation condition, the processor 130 disables the correction of the first image according to the space transformation matrix. That is to say, when the processor 130 determines that the space transformation matrix corresponding to the first image does not meet the evaluation condition, the processor 130 does not perform image geometric transformation processing on the first image according to the space transformation matrix.

In light of the above, when the space transformation matrix corresponding to the first image meets the evaluation condition, the processor 130 generates a field-of-view stabilized image based on the first image. Otherwise, when the space transformation matrix corresponding to the first image does not meet the evaluation condition, the processor 130 does not generate the field-of-view stabilized image based on the first image.

Afterwards, in step S516, the processor 130 performs feature point tracking on a second image among the continuous images based on the first feature points, so as to obtain multiple second feature points of the second image. In some embodiments, the processor 130 may extract the first image and the second image from the continuous images at a sampling frequency. For example, the first image is the i-th frame of image among the continuous images, and the second image is the (i+n)-th frame of image among the continuous images. That is to say, the processor 130 may sample an image every n frames of images to perform the process of generating the field-of-view stabilized image.

In addition, it should be noted that the processor 130 may perform feature point tracking on the second image among the continuous images with the first feature point. Since the processor 130 extracts the first image and the second image from the continuous images at the sampling frequency and omits feature point tracking for some images, feature points related to the dynamic object may be excluded more effectively.

In step S518, the processor 130 obtains another space transformation matrix between the reference image and the second image according to the reference feature points and the second feature points. In step S520, the processor 130 corrects the second image according to the another space transformation matrix and obtains another field-of-view stabilized image. The operation principle of generating the another space transformation matrix in step S518 and obtaining the another field-of-view stabilized image in step S520 is similar to the operation principle of steps S508 and S512, and the descriptions are not repeated here. In addition, in some embodiments, the processor 130 may also determine whether the another space transformation matrix meets the evaluation condition, so as to determine whether to generate the another field-of-view stabilized image corresponding to the second image.

Finally, in step S522, the processor 130 performs image synthesis processing according to the reference image and at least one field-of-view stabilized image. For example, the processor 130 may synthesize a long exposure image according to multiple short exposure images. It should be noted that since the disclosure excludes the feature points of a dynamic object to generate a space transformation matrix and further evaluates the space transformation matrix, the adverse interference of the dynamic object on image stabilization may be reduced. Based on this, the disclosure may further improve the image quality of the synthesized image based on the good image stabilization effect.

Figure 6:
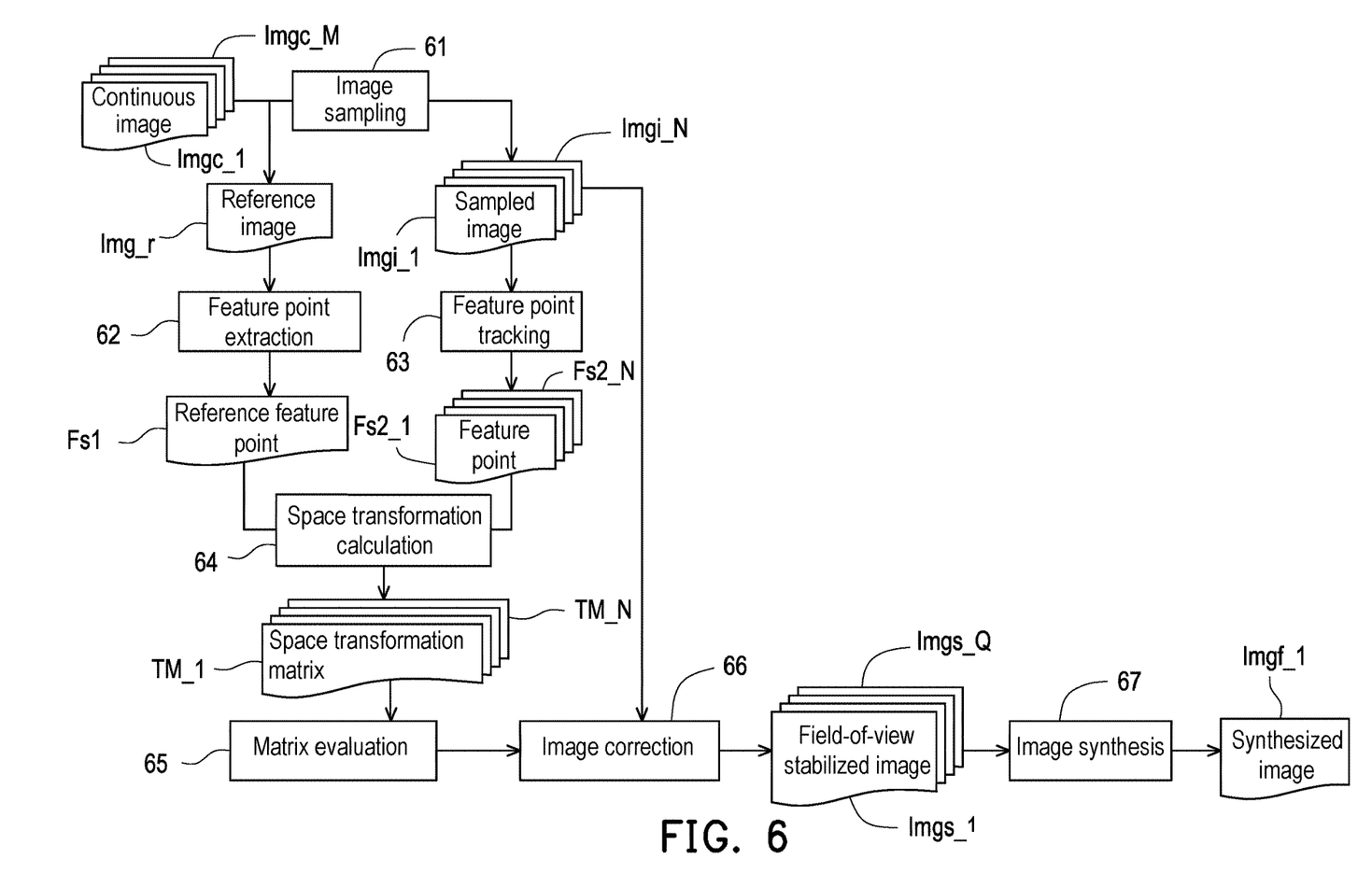
FIG. 6 is a schematic diagram of an image stabilization method according to an embodiment of the disclosure.

Referring to FIG. 6, when the user presses the shutter button, the processor 130 may capture M continuous images Imgc_1 to Imgc_M through the camera module 110. Moreover, M is an integer greater than 2. The processor 130 may select one of the continuous images Imgc_1 to Imgc_M as the reference image Img_r. In operation 61, the processor 130 may perform image sampling, and extract N sampled images Imgi_1 to Imgi_N according to the sampling frequency. In addition, N is an integer less than M. For example, the processor 130 may sample a frame of sampled image every 5 frames of continuous images.

In operation 62, the processor 130 may perform feature point extraction to extract a reference feature point Fs1 from the reference image Img_r. In operation 63, the processor 130 may sequentially perform feature point tracking on the sampled images Imgi_1-Imgi_N (i.e., the first image and the second image), so as to respectively extract N sets of feature points Fs2_1 to Fs2_N from the sampled images Imgi_1 to Imgi_N (i.e., the first feature point and the second feature point). For example, the processor 130 may extract the feature point Fs2_1 from the sampled image Imgi_1 based on the reference feature point Fs1. The processor 130 may extract the reference feature point Fs2_2 from the sampled image Imgi_2 based on the feature point Fs2_1, and so on.

In operation 64, the processor 130 may perform space transformation calculation, and generate N space transformation matrices TM_1 to TM_N respectively according to the reference feature point Fs1 and the N sets of feature points Fs2_1 to Fs2_N. In operation 65, the processor 130 may perform matrix evaluation on the N space transformation matrices TM_1 to TM_N to determine whether the N space transformation matrices TM_1 to TM_N meet the evaluation condition. In operation 66, it is assumed that Q space transformation matrices meet the evaluation condition, and Q is an integer less than or equal to N. The processor 130 may perform image correction according to the Q space transformation matrices meeting the evaluation condition and the corresponding sampled images, so as to obtain Q field-of-view stabilized images Imgs_1 to Imgs_Q. In operation 67, the processor 130 may perform image synthesis on the Q field-of-view stabilized images Imgs_1 to Imgs_Q and obtain a synthesized image Imgf_1. Based on the above, the disclosure may further improve the image quality of the synthesized image Imgf_1 based on a good image stabilization effect.

To sum up, in the embodiment of the disclosure, based on feature point tracking and feature point screening, using feature points related to the dynamic object to generate a space transformation matrix may be avoided, so as to generate a space transformation matrix according to the feature points concentrated on the static scene. Based on this, the disclosure may effectively reduce the adverse interference of the dynamic object on image stabilization. In addition, the disclosure may determine whether to generate a corresponding field-of-view stabilized image by evaluating the space transformation matrix, so using a space transformation matrix with too large error to generate an field-of-view stabilized image not in line with expectation may be avoided, and the amount of computation may further be effectively saved. Based on this, the image quality of the synthesized image generated based on multiple field-of-view stabilized images may be further improved.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. An image stabilization method, adapted for an electronic device comprising a camera module, comprising:
    capturing a plurality of continuous images through the camera module in response to receiving a camera instruction from a user;
    performing feature point extraction on a reference image among the plurality of continuous images, and obtaining a plurality of reference feature points of the reference image;
    performing feature point tracking on a first image among the plurality of continuous images based on the plurality of reference feature points, so as to obtain a plurality of first feature points of the first image, wherein each of the plurality of first feature points matches one of the plurality of reference feature points;
    obtaining a space transformation matrix between the reference image and the first image according to the plurality of reference feature points and the plurality of first feature points; and
    correcting the first image according to the space transformation matrix to obtain a field-of-view stabilized image, and synthesizing a shooting image by using the field-of-view stabilized image,
    wherein obtaining the space transformation matrix between the reference image and the first image according to the plurality of reference feature points and the plurality of first feature points comprises:
    analyzing whether each of the plurality of first feature points is related to a dynamic object; and
    in a case where a certain first feature point is determined to be related to the dynamic object, excluding the first feature point related to the dynamic object to determine the space transformation matrix.

2. The image stabilization method according to claim 1, wherein obtaining the space transformation matrix between the reference image and the first image according to the plurality of reference feature points and the plurality of first feature points comprises:
    Selecting a plurality of static feature points from the plurality of first feature points according to a position offset between each of the plurality of first feature points and one of the plurality of reference feature points matched thereof; and
    determining the space transformation matrix between the reference image and the first image according to the plurality of static feature points and part of the plurality of reference feature points.

3. The image stabilization method according to claim 2, wherein selecting the plurality of static feature points from the plurality of first feature points according to the position offset between each of the plurality of first feature points and one of the plurality of reference feature points matched thereof comprises:
    determining whether the position offset is less than an offset threshold value; and
    when the position offset corresponding to one of the plurality of first feature points is less than the offset threshold value, selecting one of the plurality of first feature points as one of the plurality of static feature points.

4. The image stabilization method according to claim 1, wherein correcting the first image according to the space transformation matrix and obtaining the field-of-view stabilized image comprises:
    determining whether the space transformation matrix meets an evaluation condition; and
    when the space transformation matrix meets the evaluation condition, correcting the first image according to the space transformation matrix and obtaining the field-of-view stabilized image.

5. The image stabilization method according to claim 4, further comprising:
    when the space transformation matrix does not meet the evaluation condition, disabling correction of the first image according to the space transformation matrix.

6. The image stabilization method according to claim 4, wherein determining whether the space transformation matrix meets the evaluation condition comprises:
    determining whether a matrix element in the space transformation matrix is within a preset range.

7. The image stabilization method according to claim 4, wherein determining whether the space transformation matrix meets the evaluation condition comprises:
    determining whether similarity between the space transformation matrix and a reference space transformation matrix is greater than a similarity threshold value, wherein the reference space transformation matrix is generated according to the reference image and a third image among the plurality of continuous images.

8. The image stabilization method according to claim 1, further comprising:
    performing feature point tracking on a second image among the plurality of continuous images based on the plurality of first feature points to obtain a plurality of second feature points of the second image, wherein each of the plurality of second feature points matches one of the plurality of first feature points;
    obtaining another space transformation matrix between the reference image and the second image according to the plurality of reference feature points and the plurality of second feature points; and
    correcting the second image according to the another space transformation matrix and obtaining another field-of-view stabilized image.

9. The image stabilization method according to claim 8, further comprising:
    extracting the first image and the second image from the plurality of continuous images at a sampling frequency.

10. An electronic device, comprising:
    a camera module;
    a processor, coupled to the camera module, and configured for:
        capturing a plurality of continuous images through the camera module;
        performing feature point extraction on a reference image among the plurality of continuous images, and obtaining a plurality of reference feature points of the reference image;
        performing feature point tracking on a first image among the plurality of continuous images based on the plurality of reference feature points, so as to obtain a plurality of first feature points of the first image, wherein each of the plurality of first feature points matches one of the plurality of reference feature points;

obtaining a space transformation matrix between the reference image and the first image according to the plurality of reference feature points and the plurality of first feature points; and correcting the first image according to the space transformation matrix to obtain a field-of-view stabilized image, and synthesizing a shooting image by using the field-of-view stabilized image, wherein obtaining the space transformation matrix between the reference image and the first image according to the plurality of reference feature points and the plurality of first feature points comprises:

analyzing whether each of the plurality of first feature points is related to a dynamic object; and in a case where a certain first feature point is determined to be related to the dynamic object, excluding the first feature point related to the dynamic object to determine the space transformation matrix.

11. An image stabilization method, adapted for an electronic device comprising a camera module, comprising:

capturing a plurality of continuous images through the camera module;

performing feature point extraction on a reference image among the plurality of continuous images, and obtaining a plurality of reference feature points of the reference image;

performing feature point tracking on a first image among the plurality of continuous images based on the plurality of reference feature points, so as to obtain a plurality of first feature points of the first image, wherein each of the plurality of first feature points matches one of the plurality of reference feature points;

obtaining a space transformation matrix between the reference image and the first image according to the plurality of reference feature points and the plurality of first feature points; and correcting the first image according to the space transformation matrix, and obtaining a field-of-view stabilized image, wherein obtaining the space transformation matrix between the reference image and the first image according to the plurality of reference feature points and the plurality of first feature points further comprises:

selecting a plurality of static feature points from the plurality of first feature points according to a position offset between each of the plurality of first feature points and one of the plurality of reference feature points matched thereof; and determining the space transformation matrix between the reference image and the first image according to the plurality of static feature points and part of the plurality of reference feature points, wherein selecting the plurality of static feature points from the plurality of first feature points according to the position offset between each of the plurality of first feature points and one of the plurality of reference feature points matched thereof comprises:

determining whether the position offset is less than an offset threshold value; and when the position offset corresponding to one of the plurality of first feature points is less than the offset threshold value, selecting one of the plurality of first feature points as one of the plurality of static feature points.

* * * * *